United States Patent [19]

Brook et al.

[11] Patent Number: 5,556,458
[45] Date of Patent: *Sep. 17, 1996

[54] CEMENTITIOUS COMPOSITIONS

[75] Inventors: John W. Brook, Mantua; David F. Factor, Hiram; Frederick D. Kinney, Broadview Hts., all of Ohio; Celeste L. McCallen, Wexford, Pa.; Andrea M. Young, Redondo Beach, Calif.

[73] Assignee: Sandoz Ltd., Basel, Switzerland

[*] Notice: The term of this patent shall not extend beyond the expiration date of Pat. No. 5,536,310.

[21] Appl. No.: 320,847

[22] Filed: Oct. 6, 1994

Related U.S. Application Data

[63] Continuation of Ser. No. 55,612, Apr. 30, 1993, abandoned, which is a continuation-in-part of Ser. No. 10,681, Jan. 28, 1993, abandoned, which is a continuation of Ser. No. 800,786, Nov. 27, 1991, abandoned.

[30] Foreign Application Priority Data

Nov. 18, 1992 [CH] Switzerland .................. 3538/92

[51] Int. Cl.$^6$ .................. C04B 7/12; C04B 24/04; C04B 28/04
[52] U.S. Cl. .................. 106/708; 106/705; 106/717; 106/724; 106/728; 106/736; 106/737; 106/810; 106/823; 106/709; 106/DIG. 1; 106/696
[58] Field of Search .................. 106/696, 705, 106/708, 713, 717, 724, 728, 819, 823, DIG. 1, 709, 736, 737, 810; 264/DIG. 49; 524/3, 650

[56] References Cited

U.S. PATENT DOCUMENTS

| | | | |
|---|---|---|---|
| 4,125,160 | 11/1978 | Crinkelmeyer et al. | 106/717 |
| 4,210,457 | 7/1980 | Dodson et al. | 106/97 |
| 4,306,912 | 12/1981 | Forss | 106/724 |
| 4,313,763 | 2/1982 | Turpin | 106/88 |
| 4,318,744 | 3/1982 | Dodson | 106/708 |
| 4,514,228 | 4/1985 | Gouvenot | 106/98 |
| 4,640,715 | 2/1987 | Heitzmann et al. | 106/85 |
| 4,642,137 | 2/1987 | Heitzmann et al. | 106/85 |
| 4,659,385 | 4/1987 | Costopoulos et al. | 106/DIG. 1 |
| 4,842,649 | 6/1989 | Heitzmann et al. | 106/89 |
| 4,961,790 | 10/1990 | Smith | 106/823 |
| 4,997,484 | 5/1991 | Gravitt et al. | 106/708 |

FOREIGN PATENT DOCUMENTS

| | | |
|---|---|---|
| 2020267 | 11/1979 | United Kingdom . |
| WO9212103 | 7/1992 | WIPO . |
| WO9212100 | 7/1992 | WIPO . |

OTHER PUBLICATIONS

M. V. Malhotra, *Fly Ash, Silica Fume, Slag and Natural Pozzolans in Concrete*, Proceedings Fourth Canmet International Conference, Istanbul, Turkey, May 1992, M. Tokyay et al., Mineralogical Investigations of High–Lime Fly Ashes, vol. I, pp. 65–73.
Chemical Abstracts, vol. 115, No. 16, Abstract No. 165247s Oct. (1991).
Chemical Abstracts, vol. 103, No. 8, Abstract No. 58252v Aug. (1985).

*Primary Examiner*—Mark L. Bell
*Assistant Examiner*—Michael Marcheschi
*Attorney, Agent, or Firm*—Robert S. Honor; Carl W. Battle; Carol A. Loeschorn

[57] ABSTRACT

A cementitious composition comprising
 (a) a cementitious material;
 (b) a fly ash which has a calcium oxide content of from 15–45% by weight;
 (c) a hydroxycarboxylic acid; and
 (d) a water-soluble source of alkali metal ions.

The compositions are useful as concretes, grouts and mortars.

20 Claims, No Drawings

CEMENTITIOUS COMPOSITIONS

This is a continuation of application Ser. No. 08/055,612, filed Apr. 30, 1993, now abandoned which in turn is a continuation-in-part of application Ser. No. 08/010,681, filed Jan. 28, 1993, which in turn is a continuation of application Ser. No. 07/800,786, filed Nov. 27, 1991, the latter two of which are now abandoned.

This invention relates to cementitious compositions and more particularly to cementitious compositions containing fly ash.

Fly ash is defined in Standard Specification C 618 of the American Society for Testing and Materials (ASTM) as "finely divided residue that results from the combustion of ground or powdered coal". ASTM C 618 (the contents of which are incorporated herein by reference) defines two distinct types of fly ash, Class F and Class C, the former (obtained from the combustion of anthracite or bituminous coal) being more common than the latter (obtained from the combustion of subbituminous coal or lignite). One characterizing feature of Class C fly ash is its higher lime content, stated by ASTM C 618 to be often "higher than 10%".

The use of fly ash in cementitious compositions confers useful properties such as enhanced final strength and durability and reduced permeability, and it has been widely used in, for example, concrete. However, it also confers low early strength (disadvantageous in many applications) and it retards the set time.

It has now been found, surprisingly, that the combination of a cementitious material, a selected fly ash and a particular type of admixture can give a cementitious composition which enjoys virtually all of the advantages of having fly ash incorporated therein, but without most, and sometimes all of the disadvantages. There is therefore provided, according to the present invention, a cementitious composition comprising (a) a cementitious material;

(b) a fly ash which has a calcium oxide content of from 15–45% by weight;

(c) a hydroxycarboxylic acid or salt thereof;

(d) a water-soluble source of alkali metal ions, and optionally (e) a retarder, preferably borax ions.

By "cementitious material" is meant a material which comprises a hydraulic cement, that is, a calcium aluminosilicate which when mixed with water will set to form a hard product. The most common type of such material is Portland cement, and for the purposes of this invention this is the preferred cementitious material. However, high alumina cement may also be used.

The cementitious material may contain other materials which are not in themselves cementitious but which can make a contribution to the setting of final product. Examples of these are the various natural and artificial pozzolans.

The nature of the fly ash which is used in the compositions of this invention is critical to the working of the invention. It must not only be a Class C fly ash, but it must also have a calcium oxide content of from 15–45%, preferably from 25–30%, by weight.

The third component is a hydroxycarboxylic acid or salt thereof. Among the acids which can be used are citric, malic, malonic, glycolic and glyoxylic acids.

The fourth component is a water-soluble source of alkali metal ions, preferably sodium or potassium. The alkali ions are preferably present such that the molar ratio of ions to hydroxycarboxylic acid of from 0.5:1 to 1.4:1, preferably 0.6:1–1:1. The source may be any water-soluble compound of an alkali metal.

The source of alkali ions may be provided by other components but in any event such source compounds are present in an amount of at least 0.5% by weight Of (a) and (b), preferably from 1.0% to 12%, more preferably 1.5% to 10%.

In an alternative and preferred embodiment of the invention, an alkali metal salt of a hydroxycarboxylic acid is used, this being considered for the purposes of the invention to be a combination of components (c) and (d). Especially useful materials are tripotassium and trisodium citrates.

The proportions of these four ingredients expressed as weight percentages of the total of cementitious material+fly ash+salt are from 50–80%, preferably 70–80% fly ash, from 20–27% cementitious material, from 0.5 to 8% hydroxycarboxylic acid or salt thereof. The respective preferred percentages are 71–73% ash, 25–26% cementitious material and 1–4% hydroxycarboxylic acid. To the essential ingredients as hereinabove described may be added other art-recognized ingredients. The most common other ingredient is aggregate, usually sand. Most useful compositions contain sand, usually to the extent of between 50 and 80% by weight of the composition. Known admixtures (as defined in ASTM C 125), for example, ligno-sulphonates, naphthalene sulphonate formaldehyde condensates and glucoheptonates may be used in art-recognized quantities. It is a surprising feature of this invention that many of these admixtures, which are known to be retarders in conventional cementitious compositions, do not exert any retarding influence on the compositions of the present invention. Further components may be non-hydraulic glassy silicates, silica fume, rice hull ash, precipitated silica and the like. Fibers suitable for use in the construction industry may also be added to the cementitious composition of the invention. Further useful components are lattices and similar polymeric modifying agents. In an especially useful and preferred embodiment of the invention, the composition also comprises a retarder, desirably as a source of borate ions, as component (e). It has been surprisingly found that this gives a considerable degree of control over the set of these compositions. Any source of borate ion is useful, borax being a convenient one. Borate ion is preferably added at the rate of 0.5–5.0% by weight of the total weight of (a)+(b)+(c)+(d) plus any admixtures present+aggregate, preferably 1–2%.

The compositions of this invention are useful in many aspects of the building trade. They can be used, for example, as concretes, mortars and grouts. They set rapidly to give hard, impermeable masses and exhibit both high early and high final strengths. They also have excellent freeze-thaw durability.

In order to gain high strength, Class C fly ash which must have a calcium oxide content of from 15% to 45%, preferably from 25% to 30%, by weight is required. Cementitious material is defined as a material which comprises a hydraulic cement which when mixed with water will set to form a hard product. The most common type of such material is portland cement, and for the purpose of this invention this is the preferred cementitious material. However, granulated blast-furnace slag cement and slag/portland cement blends may also be used. The activator may be alkaline and alkaline earth salts of hydroxycarboxylic acids; e.g. the salts of citric acid, malic acid, malonic acid, glycolic acid, and glyoxylic acid. Potassium citrate is found to be the most preferential within this group. Additional alkali can be used to further activate the binder system. Such an activator is also an accelerator for the system, especially at higher dosage.

Retarder is utilized to control the working time. It is found that alkaline salts of boric and carbonic acid, or combinations of the two have the best control. Sulfate containing salts, such as sodium sulfate, calcium sulfate or sulfate containing minerals which will react with the aluminate phases in portland cement to form ettringite, or any other type of expansive agent can be used to compensate the shrinkage.

Because of its excellent properties, the novel binder system could be used in almost unlimited applications. It is especially recommended to utilize this binder in mortar and concrete. Examples of applications for these materials include airport runways, roadways, bridge decks, or any other applications requiring rapid turn-around time. The system of invention can also be developed as a binder in floor products and grout products.

The types of fly ashes to be employed are defined as Class C or Class F in ASTM designation C 618-85. Analysis showed that the major components of both ashes are alumino-silicate glassy phases, which range from 60% to 80%. The crystalline phases in Class F fly ash are mainly inactive quartz and mullite. Class C fly ash contains quartz and some calcium bearing mineral phases, such as calcium silicate, calcium aluminate, lime, calcium sulfates, and calcium-alumino sulfates, which results in its partial hydraulic property. Because of the higher content of glass modifiers in the coal from which Class C fly ash is generated, the alumino-silicate glass network has more broken Si-O or Al-O bonds. Such network has much higher activity and the glassy phases are in the form of small solid spheres. Class F fly ash is composed mainly of hollow spheres with larger particle sizes. The glassy phase in the ashes are the main reactive phases in this novel system. The higher reactivity of the glass structure of Class C fly ash along with its partial hydraulic property make it a preferential choice for the current system of invention.

The high early strength of the binder is mainly from the alumino-silicate gel complex which is formed by the reaction between the glassy phases in the ashes and the activator, such as the alkaline and alkaline earth salts of hydroxycarboxylic acids. The preferable activator in this group is potassium citrate used in amount of 2% to 3% in Class C fly ash containing systems, or 4.5% to 6% in Class F fly ash containing systems. Citric acid is a known retarder for aluminate phases in portland cements, but potassium citrate functions as an activator, or setting time accelerator, as well as a coupling agent in the system of invention. The formation of the gel is a diffusion controlled process. The ions with smaller hydraulic radius diffuse more quickly into the reactive sites. The alkaline ions of potassium and sodium are the first to diffuse into the alumino-silicate network and break the Si-O-Si or Al-O-Al bonds to form an alkali-alumino-silicate-gel. Calcium ions and citrate ions diffuse more slowly. Ion exchange will take place eventually to form the alkali-lime-citrate-alumino-silicate gel complex which provides strength to the matrix. Divalent calcium ions and multiple carboxylic acid functional groups of potassium citrate will couple the oxygen ions and silicate or aluminate ions from broken Si-O or Al-O bonds to enhance the ultimate strength of the gel complex.

The alkali-silicate formed in the gel formation process is a very effective accelerator of portland cement as well. Calcium aluminate hydrates to form ettringite rapidly (the only aluminate hydrates which were detected in this system) and C-S-H gels are formed at early stage to reinforce the gel. The hydration of portland cement and the pozzolanic reaction from ashes provides the late age strength.

The retarder may be applied when extended working time is desirable. The amount of retarder can be adjusted depending on the ambient conditions and individual applications. The retarders may be traditional ones, wherein borax is the preferential choice in this invention. The recommended dosage of borax is 1% to 2% at temperatures below 20° C. or 3% to 4% at temperatures above 20° C. The use of a small amount of alkaline or earth alkaline salts of carbonic or hydrochloric acid at the range of 0.2% to 1%, along with borax, allows the setting time to be further extended for some special applications. Both carbonate and chloride salts are conventional accelerators for portland cement dominant system. It is a feature of this invention that many of these admixtures, which are known to be retarders in conventional cementitious compositions, do not exert any retarding influence on the compositions of the present invention. The combination of both retarders will allow the control of the setting time over temperatures ranging from −7° C. (20° F.) to 38° C. (100° F.).

To control the shrinkage of the binder, sulfate salts of potassium, sodium, or calcium and other sulfate containing minerals, such as calcium alumino silicate, can be added to the system at a dosage of 0 to 5%, preferably from 2% to 4%.

The invention is further described with reference to the following examples in which all parts are expressed by weight.

EXAMPLE 1

A high performance mortar is made by mixing the following materials:

| | |
|---|---|
| Portland cement | 10.4 parts |
| Class C fly ash | 28.0 parts |
| tripotassium citrate | 1.6 parts |
| fine sand | 60.0 parts |

Water is added to the extent of 8.3% by weight of the total composition.

Test results are as follows:

| | |
|---|---|
| % flow (5 drops) (ASTM C 230): | 80 |
| Set Time (ASTM C 266) initial: | 3.5 min. |
| final: | 5.0 min |
| Compressive strength (ASTM C 109) (2" (5 cm) cube, air cured) | |
| 2 hr.: | 33.5 mPa |
| 24 hr.: | 65.0 mPa |
| 7 day: | 85.0 mPa |

EXAMPLE 2

A high performance mortar is made by mixing the following materials:

| | |
|---|---|
| Portland Cement | 8.6 parts |
| Class C fly ash | 24.8 parts |
| tripotassium citrate | 1.0 parts |
| borax | 3.4 parts |
| sodium sulphate | 5.2 parts |
| fine sand | 57.0 parts |

Water is added to the extent of 8.3% by weight of the total composition and the text results are as follows (measured as described in Example 1)

| % flow: | 70% |
| Set time; initial: | 28 min |
| final: | 30 min |
| Compressive strength, | |
| 2 hr: | 18.6 mPa |
| 24 hr: | 51.0 mPa |
| 7 day: | 71.0 mPa |

EXAMPLE 3

This rapid strength repair mortar was developed from the binder of invention. The mortar consisted of 37% of binder, and 63% of sand. The weight percentage of each component in total mortar formula is shown below:

24.8% of Class C fly ash
8.7% of type II portland cement
1.0% of potassium citrate
1.0% of borax
1.5% of sodium sulfate
63% of sand The amount of water added was 9% of the total weight of the powdered materials.

The performance data are as following:
Setting Time (ASTM C266); @22° C. +/−1° (72° F.+/−2°)
Initial: 14–21 minutes
Final: 20–36 minutes

| Compressive Strength, (ASTM C109) MPa (PSI) | | | |
|---|---|---|---|
| | @ 10° C. (50° F.) | 21° C. (70° F.) | 32° C. (90° F.) |
| 2 hour | 9 (1300) | 17 (2400) | 18 (2600) |
| 24 hour | 33 (4800) | 43 (6300) | 45 (6500) |
| 7 day | 50 (7200) | 59 (8500) | 62 (9000) |
| 28 day | 62 (9000) | 69 (10,000) | 69 (10,000) |

EXAMPLE 4

This is the same as Example 3, except that the amount of borax was increased to 1.25%. The initial and final setting time was extended to 70 minutes and 95 minutes, respectively.

The ASTM C109 test showed that the repair mortar had compressive strength of 13.5 MPa (1960 PSI) at 3 hours, and 44 MPa (6400 PSI) at 1 day at ambient temperature of 21° C. (70° F.).

EXAMPLE 5

This is the grout product based on the technology of invention. The mix design of the whole formula is as shown:
57.24% of sand
24.8% of Class C fly ash
8.7% of type II portland cement
2.0% of potassium citrate
2.5% of borax
2.5% of Sodium sulfate
1.5% of silica fume
0.002% of alumina powder
0.75% of Class F fly ash The flowability could vary from stiff to fluid, depending on the water content which could be varied from 8.5% to 13.0%.

The compressive strengths were 13.8 MPa (2000 PSI)-27.6 MPa (4000 PSI) at 1 day; 27.6 MPa (4000 PSI)-48.3 MPa (7000 PSI) at 7 days; and 48.3 MPa (7000 PSI)-69 MPa (10,000PSI) at 28 days. The lower the water content, the higher the compressive strength. This grout system showed zero shrinkage based on ASTM C 1090 test.

EXAMPLE 6

This light reflective-floor product was also based on the invented technology. The white sand, white cement, and pigment was used to achieve the light reflectivity. The mix comprised:
58.3% of white sand
8% of white portland cement
22.5% of Class C fly ash
5% of titanium dioxide
1.8% of potassium citrate
1.5% of borax
0.4% of sodium carbonate
2.5% of sodium sulfate The water was added at a dosage of 9% to 9.25% of the total weight. The resulting floor product was nearly self-leveling with initial setting time of 2 hour and 30 minutes; final setting time of 3 hours. Its compressive strength was 33 MPa (4800 PSI) at 1 day and 52 MPa (7500 PSI) at 7 days at ambient temperature of 21° C. (70° F.).

The claims defining the invention are as follows:

1. A cementitious composition consisting essentially of
   (a) 20–27% by weight of a cementitious material;
   (b) 50–80% by weight of a fly ash which has a calcium oxide content of from 15–45% by weight of said fly ash;
   (c) 0.5–8% by weight of a hydroxytricarboxylic acid or salt thereof; and
   (d) a water-soluble source of alkali metal ions in an amount of at least 0.5% by weight based on the total weight of (a) and (b), the % by weight in (a), (b) and (c) being based on the total weight of (a), (b) and (c).

2. A cementitious composition according to claim 1, wherein the fly ash has a calcium oxide content of from 25–30% by weight.

3. A cementitious composition according to claim 1 wherein the fly ash is present in an amount of 70–80 percent by weight.

4. A cementitious composition according to claim 1 wherein the cementitious material is present in an amount of 25–26%, the fly ash is present in an amount of 71–73% and the hydroxytricarboxylic acid or salt thereof is present in an amount of 1–4%.

5. A cementitious composition according to claim 1 wherein the hydroxytricarboxylic acid or salt thereof is selected from the group consisting of citric acid, and salts thereof.

6. A cementitious composition according to claim 1 wherein (c) is a hydroxytricarboxylic acid salt.

7. A cementitious composition according to claim 6 wherein the hydroxytricarboxylic acid salt is also the water-soluble source of alkali metal ions.

8. A cementitious composition according to claim 7 wherein the hydroxytricarboxylic acid salt is trisodium citrate or tripotassium citrate.

9. A composition according to claim 1 which contains a retarder in an amount effective to retard the setting time of the composition.

10. A composition according to claim 1 which contains an anti-shrinkage agent in an amount effective to control shrinkage of the composition.

11. A composition according to claim 9 wherein the retarder is an alkali metal borate present in an amount of 0.5 to 5% by weight based on the total weight of the composition.

12. A composition according to claim 11 wherein the alkali metal borate is borax.

13. A composition according to claim 10 wherein the anti-shrinkage agent is an alkali or alkaline earth metal sulfate present in an amount of 2–4% by weight based on the total weight of components (a), (b), (c) and (d).

14. A composition according to claim 13 wherein the anti-shrinkage agent is selected from calcium, potassium or sodium sulfate.

15. A composition according to claim 11 which additionally includes an alkaline or alkaline earth metal salt of carbonic or hydrochloric acid.

16. A composition according to claim 1 wherein the cementitious material is portland cement.

17. A composition according to claim 1 which additionally includes aggregate.

18. A composition according to claim 17 wherein the aggregate is present in an amount of 50–80% by weight based on the total weight of the composition.

19. A composition according to claim 18 wherein the aggregate is sand.

20. A cementitious composition consisting essentially of (a) 20–27% by weight of a cementitious material;

(b) 50–80% by weight of a fly ash which has a calcium oxide content of from 15–45% by weight of said fly ash;

(c) 0.5–8% by weight of malic acid or a salt thereof; and (d) a water-soluble source of alkali metal ions in an amount of at least 0.5% by weight based on the total weight of (a) and (b), the % by weight in (a), (b) and (c) being based on the total weight of (a), (b) and (c).

* * * * *